(12) United States Patent
Kadalbal et al.

(10) Patent No.: US 12,072,773 B2
(45) Date of Patent: Aug. 27, 2024

(54) HYBRID SYNCHRONIZATION OF TELECOMMUNICATION NETWORK DATABASES

(71) Applicant: T-Mobile USA, Inc., Bellevue, WA (US)

(72) Inventors: Sriharsha Kadalbal, Sammamish, WA (US); Deepesh Belwal, Ashburn, VA (US); Dipta Biswas, Bothell, WA (US); Henry Ha, Covington, WA (US); Anil Kumar Mariyani, Ashburn, VA (US); Kalpana Pinnaka, Bellevue, WA (US); Kumar Pushkar, Herndon, VA (US); Anuj Sharma, Broadlands, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 86 days.

(21) Appl. No.: 17/719,083

(22) Filed: Apr. 12, 2022

(65) Prior Publication Data
US 2023/0325284 A1 Oct. 12, 2023

(51) Int. Cl.
*G06F 16/20* (2019.01)
*G06F 11/14* (2006.01)
*G06F 16/27* (2019.01)

(52) U.S. Cl.
CPC .......... *G06F 11/1464* (2013.01); *G06F 16/27* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 6,601,076 B1 * | 7/2003 | McCaw | G06F 16/273 |
| | | | 707/999.203 |
| 8,572,055 B1 * | 10/2013 | Wu | G06F 11/1458 |
| | | | 711/216 |
| 9,116,862 B1 * | 8/2015 | Rath | G06F 11/1662 |
| 10,936,545 B1 * | 3/2021 | Chockalingam | G06F 11/1448 |
| 2004/0098425 A1 * | 5/2004 | Wiss | G06F 11/2071 |
| 2011/0039518 A1 * | 2/2011 | Maria | H04W 12/06 |
| | | | 455/406 |
| 2016/0055189 A1 * | 2/2016 | Tao | G06F 16/2228 |
| | | | 707/741 |
| 2018/0167310 A1 * | 6/2018 | Kamble | H04L 45/125 |
| 2021/0286775 A1 * | 9/2021 | Beier | G06F 16/1865 |
| 2022/0164266 A1 * | 5/2022 | Butucea Panait | G06F 16/273 |
| 2022/0229829 A1 * | 7/2022 | Dye | G06F 16/2379 |

* cited by examiner

*Primary Examiner* — Jau Shya Meng
(74) *Attorney, Agent, or Firm* — Lee & Hayes, P.C.

(57) ABSTRACT

Performing hybrid synchronization of databases in a telecommunication network is described herein. Management and replication of different types of data stored in the databases can be performed differently. Provisioning data stored in the databases can be managed differently from session data stored in the databases. The provisioning data can be managed utilizing synchronous synchronization. The session data can be managed utilizing asynchronous synchronization. The provisioning data can be stored in the databases separately from the session data.

18 Claims, 5 Drawing Sheets

HYBRID SYNCHRONIZATION OF TELECOMMUNICATION NETWORK DATABASES

BACKGROUND

In 5G and other cellular systems, call set-up and service availability are reliant on availability of subscription data of users. Databases of different sizes that are separated by varying distances exchange data utilized to provide services of telecommunication networks. Systems in the telecommunication networks synchronize the databases in various ways, including synchronously or asynchronously.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein can be implemented in a number of ways. References are made to the accompanying drawings that form a part hereof, and in which are shown by way of illustration specific configurations or examples, in which like numerals represent like elements throughout the several figures.

Described herein are techniques, devices, and systems for performing hybrid synchronization of databases in a telecommunication network. Management and replication of different types of data stored in the databases can be performed differently. With the disclosed database management procedure, provisioning data stored in the databases can be managed differently from session data stored in the databases. The provisioning data can be managed utilizing synchronous synchronization. The session data can be managed utilizing asynchronous synchronization. The provisioning data can be stored in the databases separately from the session data.

Databases can be utilized in 5G, or other, cellular communication networks to store and manage subscription data that includes the provisioning data and/or the session data. In the 5G networks, the databases can include unified data repositories (UDRs). The databases can store the subscription data in a tree format that includes tree components for the provisioning data and tree components for the session data. The subscription data can be stored in the databases in a lightweight directory access protocol (LDAP) tree or a documents-based tree. The tree components for the provisioning data can be grouped together. The tree components for the session data can be grouped together. Groups of the tree components that include the provisioning data can be stored separately from groups of the tree components that include the session data.

Accordingly, the techniques, devices, and systems described herein improve the efficiency of telecommunication networks by prioritizing synchronization operations performed for databases. Different types of data being synchronized according to different priority levels can optimize operation of the telecommunication networks. Asynchronous synchronization can be utilized for lower priority data to increase available network bandwidth and decrease network latency. Synchronous synchronization can be utilized for higher priority data. By utilizing the different levels of synchronization, the higher priority data can be replicated with greater speed and reliability. Improving replication speed and reliability of higher priority data can improve user experience and operation of wireless devices utilizing services of the telecommunication networks.

Furthermore, computing resources utilized to manage the databases can be optimized by utilizing different levels of synchronization for different types of subscription data. Provisioning data, which is relatively higher priority data, can be replicated by utilizing synchronous synchronization to minimize wireless device downtime. Session data, which is relatively lower priority data, can be replicated by utilizing asynchronous synchronization. Utilizing the asynchronous synchronization for the session data, which causes relatively brief service interruptions if the session data is out of date or incorrect, minimizes the strain on database management computing resources. Accordingly, the techniques, devices, and systems described herein may allow one or more devices to conserve resources with respect to processing resources, memory resources, networking resources, power resources, etc., in the various ways described herein.

The techniques, devices, and systems described herein may be particularly beneficial for data replication in databases separated by large distances. The databases can be designed to be geo-redundant based on the synchronous replication of the provisioning data and the asynchronous replication of the session data. The different types of synchronization for the different types of subscription data enables the provisioning data in the databases to be updated in real-time or near real-time. The wireless devices utilizing the subscription data to utilize services of the telecommunication networks can operate correctly in any location.

Figure 1:
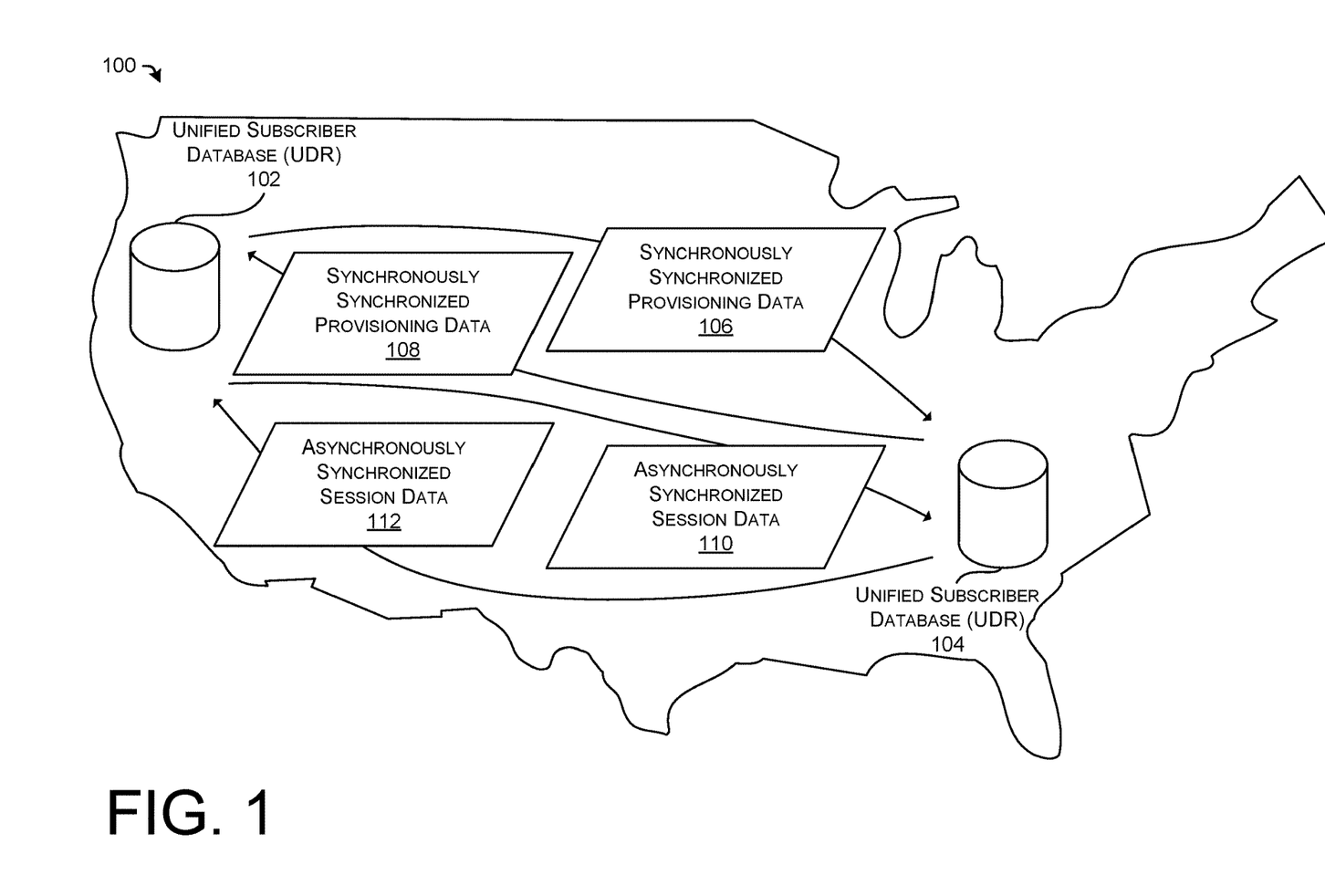
FIG. 1 is a diagram illustrating an environment for hybrid synchronization of telecommunication network databases, in accordance with some examples of the present disclosure.

Illustrative Systems for Hybrid Telecommunication Network Database Synchronization FIG. 1 is a diagram illustrating an environment 100 for hybrid synchronization of telecommunication network databases, in accordance with some examples of the present disclosure. The environment 100 can include a database 102 and a database 104. The database 102 and the database 104 can be utilized by a service provider to provide services in a telecommunication network (e.g., a 5G cellular network).

Databases (e.g., the database 102 and/or the database 104), which can be utilized to provide the telecommunication services, can include unified subscriber databases (USDs) (e.g., unified data repositories (UDRs)). For instance, with examples in which the database 102 and the database 104 are UDRs in different geographical areas (e.g., the database 102 being on the west coast of the US, and the database 104 being on the east coast of the US), the database (or "UDR") 102 can be utilized by the service provider to provide services utilized by one or more user equipment (UEs) located in a same geographical area (e.g., territory, cellular coverage region, city, state, etc.) as the UDR 102, and the database (or "UDR") 104 can be utilized by the service provider to provide services utilized by one or more user equipment (UEs) located in a same geographical area (e.g., territory, cellular coverage region, city, state, etc.) as the UDR 104.

The UDR 102 and the UDR 104 can store subscription data of different types. The subscription data stored in individual ones of the UDR 102 and the UDR 104 can include provisioning (or "static") data and/or session (or "dynamic") data. The provisioning data can be utilized to perform one or more tasks (e.g., activation(s), data-update(s), service-suspension(s), service-restoration(s), etc.) associated with one or more corresponding telecommunication network subscriptions. The provisioning data can include service data and/or policy data associated with individual ones of one or more subscribers to the telecommunication network. The session data can include data associated with individual ones of one or more sessions established by the telecommunication network (e.g., session(s) utilized by one or more corresponding UEs of the subscriber(s)).

The UDR 102 and the UDR 104 can be synchronized to replicate data (e.g., provisioning data) of the UDR 102 in the UDR 104, and vice versa. In some examples, data (e.g., data of a first type) that is stored in the UDR 102 can include provisioning data (e.g., first data). The UDR 104 can receive, from the UDR 102, duplicate provisioning data (e.g., first duplicate data) that is the same as the provisioning data in the UDR 102, the duplicate provisioning data being stored in the UDR 104 (e.g., stored as part of a synchronous synchronization operation). Based on a portion (e.g., a partial portion or an entire portion) of the provisioning data in the UDR 102 being modified to be modified provisioning data (e.g., first modified data), the modified provisioning data in the UDR 102 can be replicated in the UDR 104 as synchronously synchronized provisioning data (or "replicated data") 106.

Any provisioning data of individual ones of the UDRs (e.g., the UDR 102) that is modified can be replicated in one or more remaining ones of the UDRs (e.g., the UDR 104), and vice versa, via synchronous synchronization of the UDRs. By way of example, a network component (e.g., a server) (e.g., a service node) utilized to manage the UDR 102 can transmit a message (or "synchronization message") to a network component (e.g., a server) (e.g., a service node) utilized to manage the UDR 104, based on the provisioning data of the UDR 102 being modified to be the modified provisioning data. The synchronization message can include a synchronization parameter (e.g., a synchronous synchronization parameter) (e.g., a real-time or near real-time parameter), utilized by the UDR 104 to determine to replicate the provisioning data. The synchronous synchronization parameter can be associated with one or more flags associated with the modified provisioning data. The modified provisioning data of the UDR 102 can be transmitted to the UDR 104 as part of the synchronization message or one or more other messages. A portion (e.g., a partial portion or an entire portion) of the modified provisioning data received from the UDR 102 can be utilized to replace and/or update a portion (e.g., a partial portion or an entire portion) of the duplicate data in the UDR 104, the modified provisioning data being stored in the UDR 104. The modified provisioning data can be received and stored by the UDR 104 as part of a synchronous synchronization operation (or "backup operation") (e.g., a first backup operation).

The message transmitted by the network component can be utilized to manage the UDR 102 based on a portion (e.g., a partial portion or an entire portion) of the provisioning data of the UDR 102 being modified. Replication of provisioning data can be performed as part of a synchronous synchronization operation to replicate the provisioning data of the UDR 102 in the UDR 104, or vice versa, in real-time or near-real time. Updates in near real-time can include updates performed in an amount of time (e.g., updates performed in one millisecond, one second, one minute, ten minutes, etc.).

Similar to the modified provisioning data of the UDR 102 being replicated in the UDR 104, provisioning data of the UDR 104 that is modified can be replicated in the UDR 102. By way of example, modified provisioning data of the UDR 104 can be replicated in the UDR 102 as synchronously synchronized provisioning data 108. Similar to replication of the modified provisioning data of the UDR 102, the replication of the modified provisioning data of the UDR 104 can be performed based on a message transmitted by the network component utilized to manage the UDR 104.

The UDR 102 and the UDR 104 can be synchronized to replicate data (e.g., session data) of the UDR 102 in the UDR 104, and vice versa. In some examples, data (e.g., data of a second type) that is stored in the UDR 102 can include session data (e.g., second data). The UDR 104 can receive, from the UDR 102, duplicate session data (e.g., second duplicate data) that is the same as the session data in the UDR 102, the duplicate session data being stored in the UDR 104 (e.g., stored as part of an asynchronous synchronization operation). Based on a portion (e.g., a partial portion or an entire portion) of the session data in the UDR 102 being modified to be modified session data (e.g., second modified data), the modified session data in the UDR 102 can be replicated in the UDR 104 as asynchronously synchronized session data (or "replicated data") 110. A portion (e.g., a partial portion or an entire portion) of the modified session data in the UDR 102 can be stored to replace and/or update a portion (e.g., a partial portion or an entire portion) of the duplicate session data in the UDR 104. The modified session data in the UDR 102 can be replicated in the UDR 104 at a time (or "first time") (e.g., an initial time). The session data (e.g., the second data) in the UDR 102 being modified to be the modified session data (e.g., the second modified data) can occur prior to the initial time.

Any session data of individual ones of the UDRs (e.g., the UDR 102) that is modified can be replicated in one or more remaining ones of the UDRs (e.g., the UDR 104), and vice versa, via asynchronous synchronization of the UDRs. By way of example, the network component utilized to manage the UDR 104 can determine an amount of time between the initial time and a current time meets or exceeds a threshold amount of time. The modified session data of the UDR 102 can be transmitted to the UDR 104 as part of a message (e.g., a response message) that is transmitted by the network component utilized to manage the UDR 102, the message being received by the network component utilized to manage the UDR 104. The message (e.g., a response message) (or "synchronization response message") can be transmitted by the UDR 102 in response to a message (e.g., a request message) (or "synchronization request message") transmitted by the UDR 104 and received by the UDR 102. The request message and/or the response message can include a synchronization parameter (e.g., an asynchronous synchronization parameter) (e.g., a time period parameter) (e.g., the asynchronous synchronization parameter can be utilized by the UDR 104 to determine to replicate the session data). The asynchronous synchronization parameter can be associated with one or more flags associated with the modified session data. The modified session data (e.g., the second modified data) received from the UDR 102 can be utilized to replace and/or update the duplicate session data in the UDR 104, the modified session data being stored in the UDR 104. The modified session data can be received and stored by the UDR 104 as part of an asynchronous synchronization operation (or "backup operation") (e.g., a second backup operation).

Similar to the modified session data of the UDR 102 being replicated in the UDR 104, session data of the UDR 104 that is modified can be replicated in the UDR 102. By way of example, modified session data of the UDR 104 can be replicated in the UDR 102 as asynchronously synchronized session data 112. In a similar way as for the replication of the modified session data of the UDR 102, the replication of the modified session data of the UDR 104 can be performed based on an amount of time between a time at which the UDR 102 was previously synchronized (e.g., a previous synchronization time) and a current time meeting or exceeding a threshold amount of time.

Figure 2:
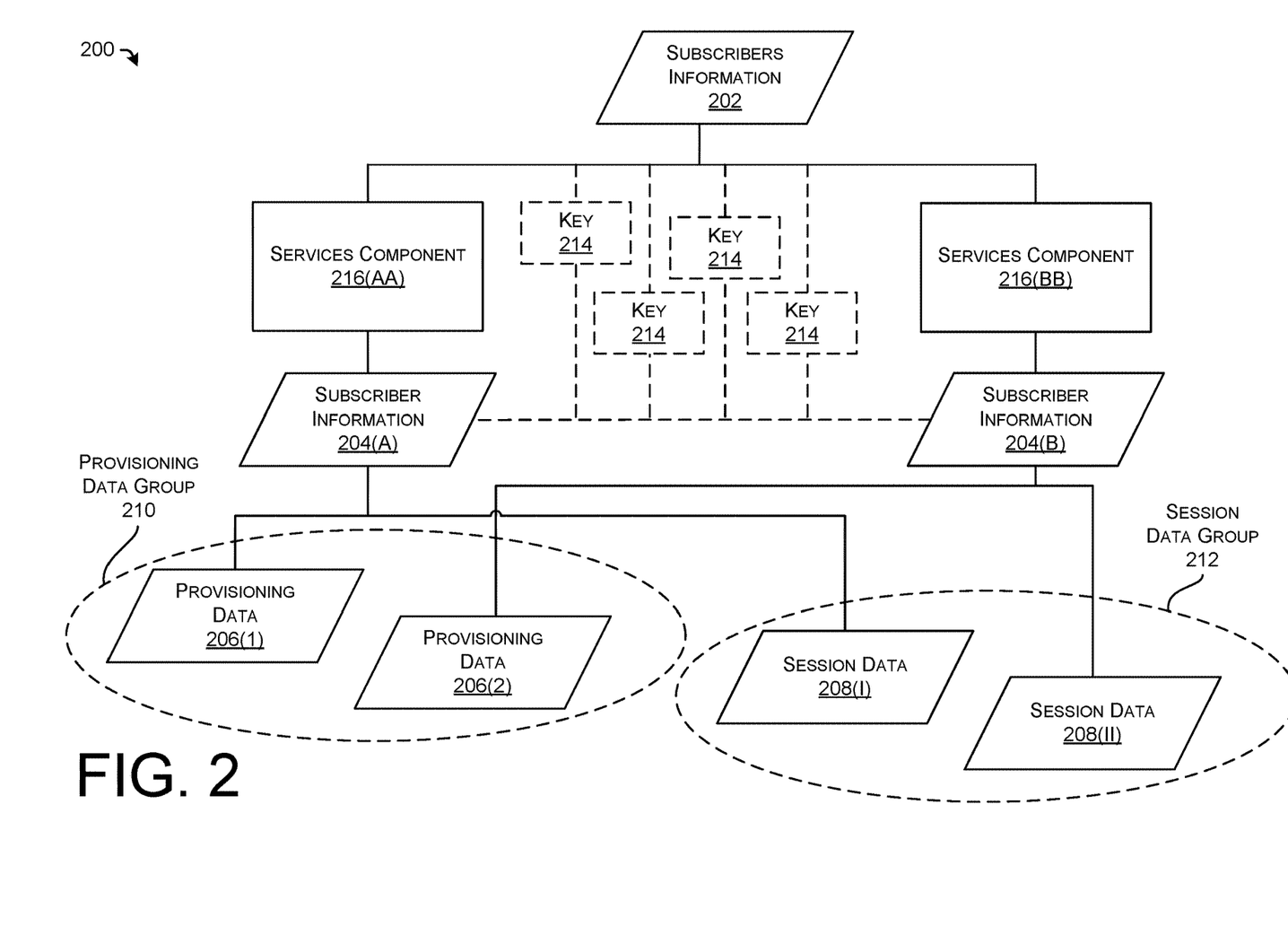
FIG. 2 is a block diagram illustrating data management tree for hybrid synchronization of telecommunication network databases, in accordance with some examples of the present disclosure.

FIG. 2 is a block diagram illustrating a data management tree 200 for hybrid synchronization of telecommunication network databases, in accordance with some examples of the present disclosure. For example, the data management tree 200 can be utilized for hybrid synchronization of subscribers information 202 in individual ones of one or more telecommunication network databases (e.g., the UDR 102 and/or the UDR 104). The subscribers information 202 can include individual ones of one or more subscriber information 204(A) and 204(B) (collectively referred to as "subscriber information 204") associated with one or more corresponding subscribers, which can be associated with corresponding user equipment (UE) (e.g., the UEs 314, 316, as discussed below with reference to FIG. 3). Individual ones of the subscriber information 204(A) and 204(B) can include, respectively, provisioning data 206(1) and 206(2) (collectively referred to as "provisioning data 206"), and session data 208(I) and 208(II) (collectively referred to as "session data 208").

Portions of the subscribers information 202 (e.g., portions of individual ones of the subscriber information 204(A) and 204(B)) can be grouped based on data types. The provisioning data 206 can be grouped into a provisioning data group 210. Individual ones of the provisioning data 206(1) and 206(2) can include one or more of circuit provisioning data, service provisioning data, and switch provisioning data. One or more of the circuit provisioning data, the service provisioning data, and the switch provisioning data can be updated via synchronous synchronization operations together or separately. The session data 208 can be grouped into a session data group 212.

Individual ones of the provisioning data 206 and/or individual ones of the session data 208 can be stored with flags indicating replication types. By way of example, the provisioning data 206(1) can be stored with a flag (or "data flag") (e.g., a synchronous synchronization flag) indicating replication of the provisioning data 206(1) is performed by synchronous replication. By way of the same or another example, the session data 208(1) can be stored with a flag (e.g., an asynchronous synchronization flag) indicating replication of the session data 208(1) is performed by asynchronous replication. The flag can be utilized by the network component to determine types of synchronizing operations to be performed, and to perform the synchronizing operations, as discussed throughout this disclosure.

Although individual ones of the provisioning data 206 and/or individual ones of the session data 208 can be stored with flags as discussed above in the current disclosure, it is not limited as such. In some examples, a flag (or "group flag") (e.g., a provisioning data group flag) can be stored in the provisioning data group 210 and/or a flag (e.g., a session data group flag) can be stored in the session data group 212, along with the flags in the data (e.g., the provisioning data 206 and/or the session data 208). The group flags can be utilized by the network component to perform synchronizing operations in a similar way as for the data flags. Any of the flags can be stored in, or along with, the tree components (e.g., nodes, sub-documents, etc.).

The hybrid synchronization, which can be utilized for replication of the individual ones of the subscriber information 204, can include synchronous synchronization of one or more of the provisioning data 206, and asynchronous synchronization of one or more of the session data 208. In some examples, the replication (e.g., a period of time during which replication occurs) of any of the provisioning data 206 (e.g., the provisioning data 206(1)) can overlap (e.g., partially overlap or entirely overlap) the replication of one or more others of the provisioning data 206 (e.g., the provisioning data 206(2)), and/or overlap (e.g., partially overlap or entirely overlap) the replication of one or more of the session data 208 (e.g., the session data 208(I) and/or the session data 208(II)). In those or other examples, the replication (e.g., a period of time during which replication occurs) of any of the session data 208 (e.g., the session data 208(I)) can overlap (e.g., partially overlap or entirely overlap) the replication of one or more others of the session data 208 (e.g., the session data 208(II)), and/or overlap (e.g., partially overlap or entirely overlap) the replication of one or more of the provisioning data 206 (e.g., the provisioning data 206(1) and/or the provisioning data 206(2)).

The subscribers information 202 can be managed (e.g., accessed, updated, stored, etc.) by utilizing one or more services components 216(AA) and 216(BB) (collectively referred to as "services components 216"). The services components 216 can utilize information associated with subscribers (e.g., accounts of subscribers). In some examples, the information associated with the subscriber accounts can include one or more keys 212. The key(s) 214 can include a device identifier (ID), a phone number, an international mobile subscriber identity (IMSI), an internet protocol (IP) address, a service provider login (e.g., an identifier including an account name), etc., associated with a subscriber.

Although the services components 216(AA) and 216(BB) can be utilized for synchronization as discussed above in the current disclosure, it is not limited as such. In some examples, the services components 216(AA) and 216(BB) can be integrated together as a services component. In those or other examples, individual ones of one or more of the services components 216 (e.g., the service component 216 (AA) or 216(BB)) can be implemented as one or more services components (e.g., services component(s) that are integrated/combined together or separate from one another), which can be utilized to perform any of the techniques as discussed throughout this disclosure in a similar way as for the services components 216(AA) and 216(BB). Any of the services components can be included in one or more of the databases and/or one or more network components utilized to manage the database(s).

Replication (e.g., replication associated with synchronous synchronization and/or asynchronous synchronization) in any database can be performed based on one or more messages received from one or more network components associated with one or more other corresponding databases. A message (e.g., a request message), which can be utilized for synchronous synchronization, can be transmitted by a network component associated with the database (e.g., the UDR 104). In some examples, the replication of the provisioning data 206(I) in the database (e.g., the UDR 104) can be performed based on a message (e.g., a replication/synchronization message) being received from the network component associated with the UDR 102. The UDR 102 can transmit the synchronization message, including the provisioning data of the UDR 102 that has been modified to be the modified provisioning data. The synchronization message can include one or more of the keys 214, which can be utilized by the UDR 104 to determine (e.g., identify and/or select) a portion of the subscribers information 202 (e.g., the provisioning data 206(I) to be replaced by data (e.g., the modified provisioning data) received from the UDR 102. The data (e.g., the modified provisioning data) received from the UDR 102 can be received together (e.g., within) with the synchronization message, and/or separately from the synchronization message, in one or more other messages.

Replication associated with asynchronous synchronization can be performed based on one or more messages associated with the asynchronous synchronization. In some examples, a message (e.g., a request message) can be received by a network component associated with any of the databases (e.g., the UDR 102). The request message can be processed by the network component associated with the UDR 102 and utilized to transmit, to another network component associated with another database (e.g., the UDR 104), another message (e.g., a response message). The response message can be utilized to replicate the modified session data of the UDR 102 in the UDR 104.

The message(s) (e.g., the request messages) utilized to request replication associated with asynchronous synchronization can be transmitted at different times. In some examples, the request messages can be transmitted based on an amount of time between a previous synchronization time (e.g., a time at which a previously synchronization operation was performed) and a current time meeting or exceeding a threshold amount of time. The threshold amount of time, which can be set in the network component that transmits the request message, can be any amount of time (e.g., one second, one minute, 15 minutes, one hour, one day, etc.).

The tree 200 can be any type of data management tree. In some examples, the tree 200 can be a directory information tree (e.g., a lightweight directory access protocol (LDAP) tree) including components (or "tree components") (e.g., nodes) associated with portions of the subscribers information 202. Individual ones of nodes of the tree 200 can include corresponding provisioning data 206, the nodes being grouped (e.g., stored) in the provisioning data group 210. Individual ones of nodes of the tree 200 can include corresponding session data 208, the nodes being grouped (e.g., stored) in the session data group 212. In some examples, the tree 200 can be a documents-based tree including components (e.g., documents and sub-documents) associated with portions of the subscribers information 202. Individual ones of sub-documents of the tree 200 can include corresponding provisioning data 206, the sub-documents being grouped (e.g., stored) in the provisioning data group 210. Individual ones of sub-documents of the tree 200 can include corresponding session data 208, the sub-documents being grouped (e.g., stored) in the session data group 212.

Although the tree 200 can be the LDAP tree or the documents-based tree as discussed above in the current disclosure, it is not limited as such. In some examples, the tree 200 can be any type of tree, which can include portions associated with corresponding portions of the subscribers information 202, and which can be utilized to implement any techniques discussed throughout this disclosure in a similar way as for the LDAP tree and the documents-based tree.

Therefore, and as described herein, provisioning data (e.g., nodes, sub-documents, etc., including the provisioning data) that is usable by provisioning users can be updated at a greater frequency than session data (e.g., nodes, sub-documents, etc. including the provisioning data). The provisioning data (e.g., data associated with various types of subscribers information, including data associated with a modification of a subscription plan, a bill that is unpaid, service getting hotlined or blocked, or an additional device added onto a subscriber account, etc.), and updates thereof, can be given a higher priority than the session data (e.g., data associated with an established session), and updates thereof. The provisioning data updates can be given the higher priority due to out of date provisioning data being more likely to cause more extensive and more frequent delays in comparison to out of date session data.

Moreover, assigning higher priorities to provisioning data updates than for session data updates increases the overall quality of subscriber experiences. The session data, which can be updated via access application clients (e.g., a home subscriber server (HSS) function, a unified data management (UDM) function, etc.), can be updated at a less frequent rate than the provisioning data. Updating the session data relatively less frequently via asynchronous synchronization conserves computing and/or network resources, thereby increasing reliability of provisioning data updates via synchronous synchronization. The updates of the provisioning data can be performed without delays or interruptions.

Relatively longer delays experienced due to out of date provisioning data can be more onerous to subscribers than relatively shorter delays experienced due to out of date session data. Out of date session data can be easily overcome by subscribers that experience dropped calls or service interruptions. The subscribers that experience the service interruptions can simply operate their UEs to request reestablishment of services. The subscribers experiencing dropped calls due to out of date session data can place new calls to refresh session data. This is unlike operations required to be performed to update out of date provisioning data, which often require an extensive amount time. By conserving computing and network resources for real-time or near real-time provisioning data updates, services provided to UEs of subscribers (or "clients") can more reliable and consistent.

Organizing the provisioning data in a group (e.g., a group of nodes/sub-documents) of the tree, and the session data in a different group (e.g., another group of nodes/sub-documents) of the tree, enables efficient and straightforward hybrid synchronization for the data in tree. Synchronization of one or more portions of the provisioning data in the provisioning data group can be performed synchronously, and synchronization of one or more portions of the session data in the session data group can be performed asynchronously.

The hybrid synchronization of the database can be utilized to avoid problems resulting from databases exclusively utilizing synchronous synchronization or asynchronous synchronization for all data. Utilizing synchronous synchronization for all data can result in delays due to limitations of computing and/or network resources being unable to synchronize all of the data in real-time or near real-time. Synchronous synchronization of all data in one or more UDMs by some systems according to conventional technology may not be possible due to physical constraints resulting from large amounts of data being managed by UDMs separated by large distances. On the other hand, asynchronous synchronization of all data in one or more UDMs by some systems according to conventional technology can result in the provisioning data being out of date, which in turn can cause large delays in repairing service interruptions. The hybrid synchronization enables the provisioning data to be updated in real-time or near real-time, due to the less crucial session data being updated less frequently.

Figure 3:
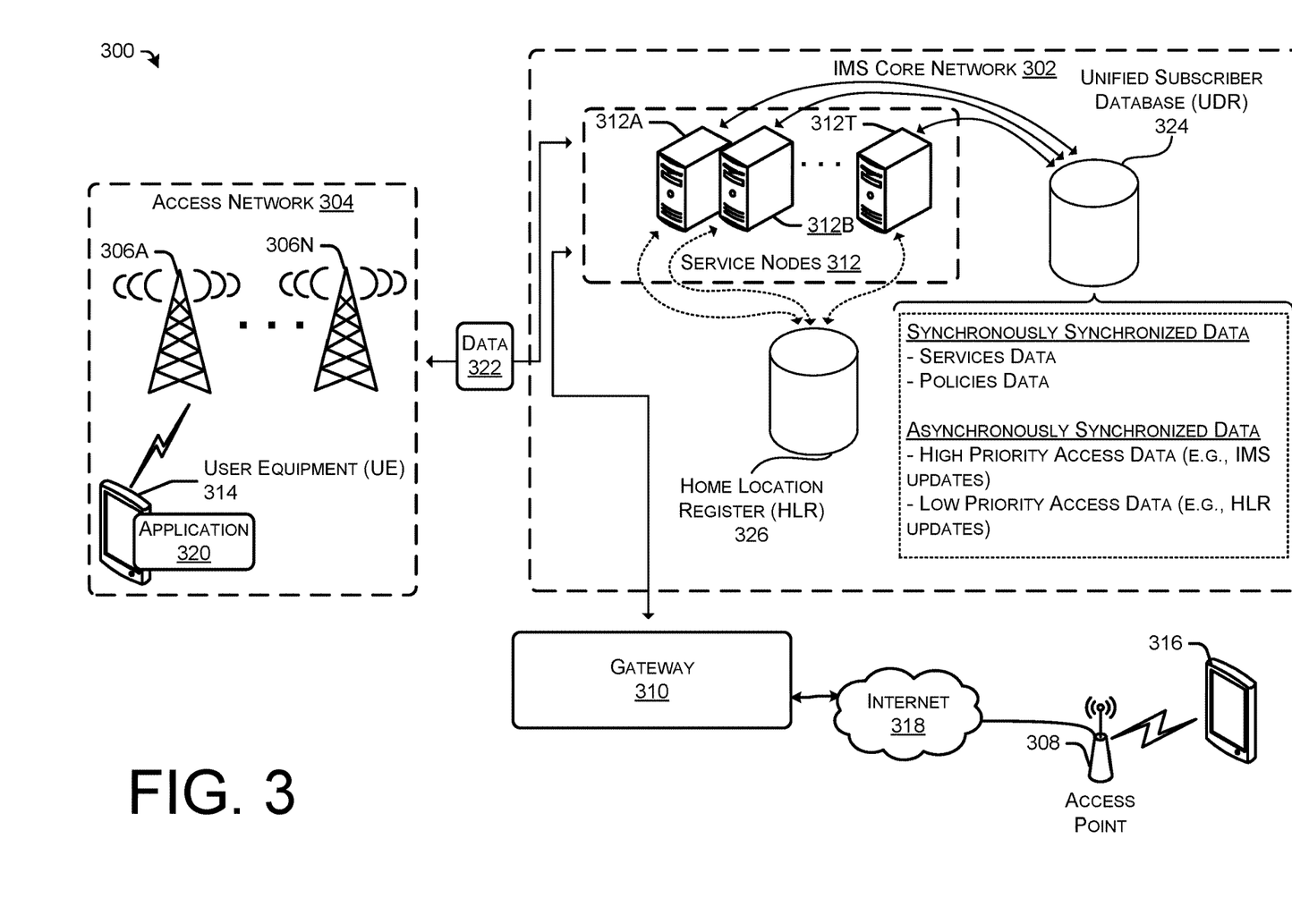
FIG. 3 is a block diagram illustrating an environment for hybrid synchronization of telecommunication network databases, in accordance with some examples of the present disclosure.

FIG. 3 is a block diagram illustrating an environment 300 for hybrid synchronization of telecommunication network databases, in accordance with some examples of the present disclosure. For example, the environment 300 can include a core network (e.g., an internet protocol (IP) multimedia system (IMS) core network) 302 and an access network 304 that is associated with a wireless service provider. The environment 300 is illustrated in simplified form and can include many more components.

The environment 300 can include nodes 306, such as nodes 306A-306N, which can also be referred to herein as "cells." The nodes 306 can be wireless nodes or wired nodes that are coupled to core network 302 and/or some other network. The environment 300 can also include one or more access points 308, one or more gateways 310, and one or more service nodes 312A-312T (collectively referred to as "service nodes 312"). A node, such as a node 306 can handle traffic and signals between electronic devices, such as a user equipment (UE) 314, 316, and the core network 302. For example, a node 306 can perform the transcoding of speech channels, allocation of radio channels to electronic devices, paging, transmission and reception of voice and data, as well as other functions. A node 306 can include several base transceiver stations (BTS), each BTS can include a transceiver, antenna, and additional network switch and control equipment that provide a network cell for facilitating wireless communication between UE computing devices and the core network 302. In some examples, the nodes 306 can include a gNodeB and/or an eNodeB.

The core network 302 can be responsible for performing hybrid database synchronization (e.g., synchronous and/or asynchronous database synchronization), routing voice communication to other networks, as well as routing data communication to external packet switched networks, such as the Internet 318. For example, the one or more service nodes 312A-312T can include a gateway general packet radio service support node (GGSN) or another equivalent node, a policy and charging rules function (PCRF) node (e.g., a primary PCRF node and/or a backup PCRF node, which can be utilized to enforce policy rules of the network and make bindings for communications between endpoints), a diameter routing agent (DRA) node, a policy and charging enforcement function (PCEF) node, etc. The PCRF nodes can be configured to automatically make policy decisions for each subscriber (e.g., each user equipment (UE)) active on the network. For example, the PCRF can be utilized to allocate bandwidth of the network as well as provide different levels of service to different computing devices on the network.

UEs (e.g., the UE 314 and/or the UE 316) can be computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using the cellular access network 304, and/or over a Wi-Fi network, or some other type of network. In some instances, the UEs 314, 316 computing devices can be configured to send and receive data using any wired or wireless protocols. Additional examples of the UEs 314, 316 include, but are not limited to, smart devices such as televisions, music players, vehicles (e.g., cars, trucks, buses, . . . ), internet of things (IoT) computing devices, or any other electronic appliances or computing devices that can generate, request, receive, transmit, or exchange voice, video, and/or digital data over a network. The UEs 314, 316 can further be configured to establish or receive a communication session, such as a VoLTE, VoNR, VoWifi, or other voice call, a video call, or another sort of communication. Establishment of such sessions can involve communication clients and session initiation protocol (SIP) clients to communicate with the telecommunications network.

In some examples, one or more of the service nodes 312 can be configured as one or more application servers that provide support for one more applications, such as application 320 utilized by one or more UEs 314, 316 computing devices. Some example applications include, but are not limited to browser applications, messaging applications, voice applications (e.g., voice over internet protocol (VoIP) applications), video applications, game applications, and the like.

While the service nodes 312 are illustrated within the core network 302, one or more other computing devices can be located outside of the core network 302. For example, an application server, or some other server or device, can be connected to the core network 302 via one or more external packet switched networks, such as the Internet. In some examples, one or more computing devices outside of the core network 302 can be utilized to perform processing related to transmitting application data using different quality of service (QoS) specifications.

According to some configurations, a client application, such as the application 320, on the UE 314 can establish data communication with the network 302 through a data connection to one of the nodes 312 (e.g., the node 312A). The node 312A may route a communication wired/wirelessly from the UE 314 through the access network 304 for communication to the core network 302.

When a communication request arrives at the network 302, one or more of the service nodes 312 may determine the identity of the originating computing device for the communication (e.g., using a telephone number, IMEI, IMSI, IP address) as well as the identity of the computing devices to send the communication. According to some configurations, the UE 316 may connect to the service nodes 312, or some other component such as an application server, via the Internet 318. In such instances, the UE 316 may connect to the Internet 318 via the Wi-Fi access point 308. Accordingly, data traffic from the UE 317 may be routed to the service nodes 312 by the gateway 310 of the network 302.

In some configurations, a wireless service provider may utilize alternative access vendor (AAV) networks, for example, which utilize Ethernet networks to provide a wired connection, such as wired connection, to provide at least a portion of backhaul for broadband cellular services, such as 5G networks. In other examples, the wireless service provider may deploy its own wired connections.

In general, a node 312 can be implemented as a variety of technologies to provide wired and/or wireless access to the network, as discussed herein. In some instances, the nodes 312 can include a 3GPP RAN, such a GSM/EDGE RAN (GERAN), a universal terrestrial RAN (UTRAN), an evolved UTRAN (E-UTRAN), or a new radio (5G) RAN, or alternatively, a "non-3GPP" RAN, such as a Wi-Fi RAN, or another type of wireless local area network (WLAN) that is based on the IEEE 802.11 standards. Further, the nodes 312 can include any number and type of transceivers and/or base stations representing any number and type of macrocells, microcells, picocells, or femtocells, for example, with any type or amount of overlapping coverage or mutually exclusive coverage. The nodes 312 can be associated with access network 304.

As shown in FIG. 3, some nodes 312 have no physical (i.e., "wired") data connection to network. In other words, some of the nodes, such as node 312A, are not connected to the core network 302 using fiber cabling, copper cabling, and/or some other type of wired connection. The nodes 312 that do not have a wired connection may be connected to one or more wired nodes 312, such as node 312T, that does have a wired connection to the core network 302. A wired node utilizes fiber, or other wired data connections, to connect to the core network 302. As shown, wired node 312T connects to the core network via an Ethernet connection via a fiber optic, coaxial, or other high speed wired data connection. A wired node, such as node 312T, could also be connected by a coaxial, T1, T3, or other suitable high-speed connection to the core network 302. In some configurations, mesh networking technology can be used to connect different nodes 306 within the access network 304. Geographic information services (GIS) and other terrain and location information systems can be used to determine nodes to provide a connection between one or more non-wired nodes and the network 302.

In some instances, the environment 300 can further include one or more servers, including service nodes 312, to facilitate communications by and between the various devices in the environment 300 and perform operations relating to failing over to a node 312 (e.g., the backup PCRF node) in case of a failure condition with a node 312 (e.g., the primary PCRF) in a cellular network. That is, environment 300 can include any computing devices implementing various aspects of one or more of second, third, fourth generation, and fifth generation (2G, 3G, 4G, and 5G) cellular wireless access technologies, which may be cross-compatible and may operate collectively to provide data communication services. Global Systems for Mobile (GSM) is an example of 2G telecommunications technologies; Universal Mobile Telecommunications System (UNITS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 300 may implement GSM, UNITS, LTE/LTE Advanced, and/or 5G NR telecommunications technologies.

The environment 300 may include, but is not limited to, a combination of: base transceiver stations BTSs (e.g., NodeBs, Enhanced-NodeBs, gNodeBs), radio network controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an internet protocol (IP) multimedia subsystem (IMS), or any other data traffic control entity configured to communicate and/or route data packets between the UE 314, the nodes 312, and one or more endpoints of the network (e.g., service nodes 312, websites, etc.). While FIG. 3 illustrates an example environment 300, it is understood in the context of this document, that the techniques discussed herein may also be implemented in other networking technologies.

The access network 304 can be any sort of access network, such as a GSM or UMTS network. The access network 304 can include any aspects of one or more of second, third, fourth generation, and fifth generation (2G, 3G, 4G, 4GLTE, and 5G) cellular wireless access technologies. The access network 304 can also be referred to as a universal terrestrial radio network (UTRAN) or a GSM EDGE radio access network (GERAN) and can include one or base stations, as well as a radio network controller (RNC).

In the example illustrated in FIG. 3, the UE 314 connects to a node 312 (e.g., a DRA node) to transmit data 322. The application data 320 and other data may be transmitted across different networks. For example, the networks may be LTE networks (e.g., mid-band frequencies: LTE 2.1 GHz+ LTE 1.9 GHz), 5G networks, and/or some other frequency(s) (e.g., 2.5 GHz).

As discussed above, one or more service nodes (or "network components") 312 can be utilized to manage one or more databases (e.g., UDRs). By way of example, a service node 312 can be utilized to manage a UDR 324. The UDR 324 can be utilized to implement any of one or more of the UDRs 102 and 104, as discussed above with reference to FIG. 1. The service node 312 can perform hybrid synchronization of the UDR 324, as discussed above with reference to FIG. 1. The UDR 324 can communicate with one or more of the service nodes 312 via one or more networks, in any of the ways utilized by the service nodes 312 for communication via the network(s), as discussed above. In some examples, the UDR 324 can be integrated with one or more of any of the service nodes 312.

Various types of data stored in the UDR 324 can be synchronized differently. The UDR 324 can utilize synchronous synchronization to replicate provisioning data of another UDR in the UDR 324, or vice versa. The provisioning data can include services data and/or policies data. The services data can include data associated with management (e.g., activation(s), data-update(s), service-suspension(s), service-restoration(s), etc.)) of one or more services utilizable by the UEs 314, 316. The policies data can include data associated with one or more policies of the service(s) utilizable by the UEs 314, 316 (e.g., policies for data quality, access, security, privacy and usage, as well as roles and responsibilities for implementing the policies and monitoring compliance).

The UDR 324 can utilize asynchronous synchronization to replicate session data of another UDR in the UDR 324. The session data can include various types of data, including data utilized for various types of updates (e.g., IMS updates, home location register (HLR) updates, etc.). The session data in another UDR that is replicated in the UDR 324, or vice versa, can include data that is replicated in order based on a priority of the data. By way of example, the asynchronous synchronization can include replication of data (or "IMS updates data") (e.g., data of a first sub-type of the session data) associated with the IMS core network 302, prior to replication of data (or "HLR updates data") e.g., data of a second sub-type of the session data) stored in an HLR 326. The HLR 326 can communicate with one or more of the service nodes 312 and/or the UDR 324 via one or more networks, in any of the ways utilized by the service nodes 312 for communication via the network(s), as discussed above. The replication of the IMS updates data can be replicated prior to the HLR updates data based on a priority (or "priority level") (e.g., a first priority level) of replication (or "IMS updates data replication") of IMS updates data replication being higher than a priority (e.g., a second priority level) of replication (or "ULR updates data replication") of ULR updates data.

Therefore, and as described herein, the provisioning data can be synchronized at greater rates than the session data. The session data can include different types of session data synchronized at different rates. Updates of the session data via asynchronous synchronization can include updates (e.g., IMS updates, etc.) of relatively higher priority access data and updates (e.g., HLR updates) of relatively lower priority access data. IMS updates can be given a priority level that is higher than for HLR updates. The IMS updates with the higher priority level can be performed priori to, and/or more frequently than, the HLR updates. For instance, with examples in which session data is being updated via an asynchronous synchronization operation, the IMS data can be updated prior to the HLR data. In those or other examples, more frequent updates can be performed for the IMS data via higher priority asynchronous synchronization operations than for the HLR data via lower priority asynchronous synchronization operations.

Although session data with higher priority updates can include IMS data and session data with lower priority updates can include HLR data as discussed above in the current disclosure, it is not limited as such. One or more of various types of session data with higher priority updates than the IMS data updates and/or the HLR updates can be managed in a similar way as for the IMS data updates. One or more of various types of session data with lower priority updates than the IMS data updates and/or the HLR data updates can be managed in a similar way as for the HLR data updates. In some examples, one or more types of other data with higher priority updates or lower priority updates in comparison to the IMS data and/or the HLR data can be updated based on the relative priority levels of the other data, and/or the updates thereof.

Figure 4:
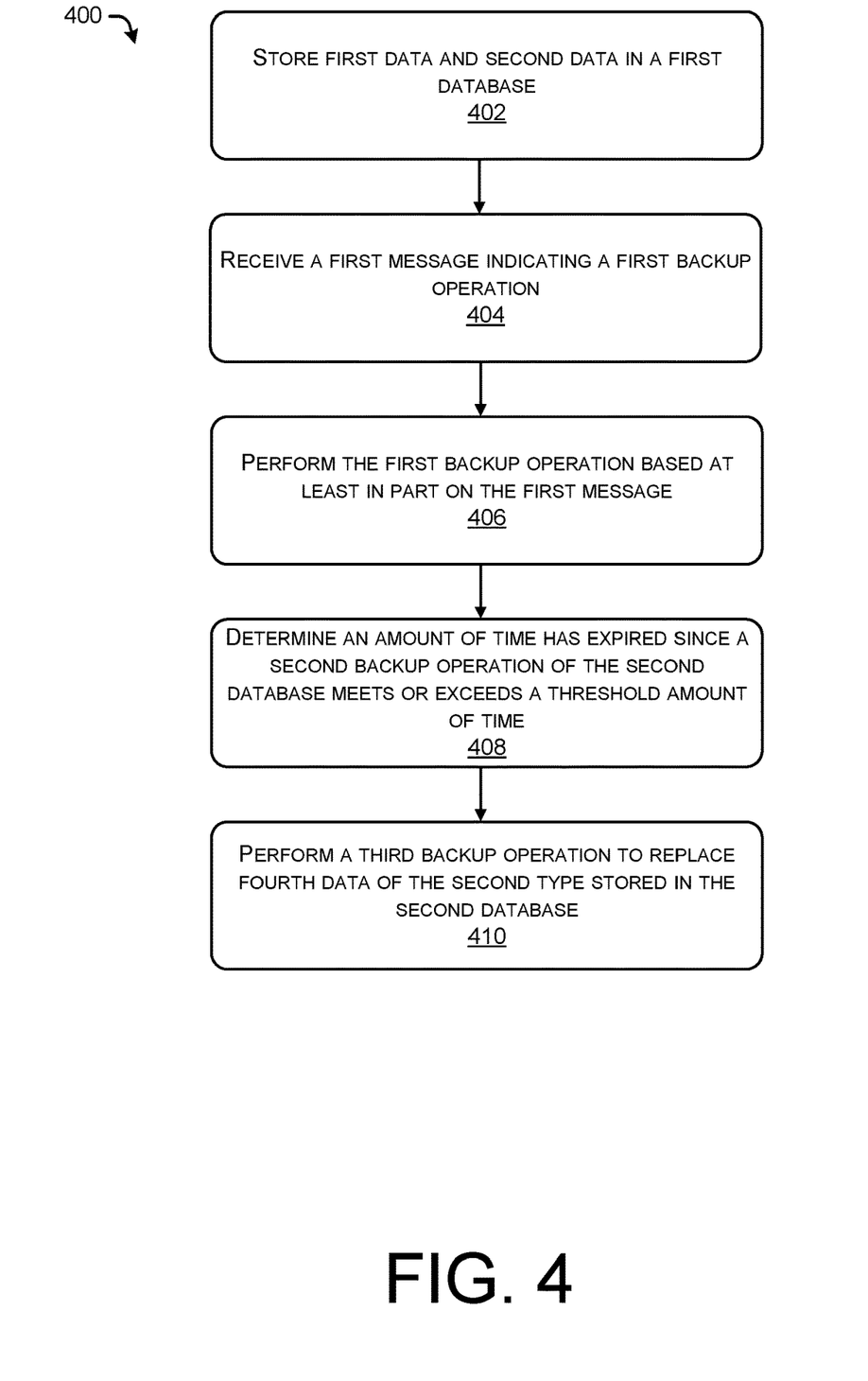
FIG. 4 is a flowchart illustrating a process for hybrid synchronization of telecommunication network databases, in accordance with some examples of the present disclosure.

FIG. 4 is a flowchart illustrating a process for hybrid synchronization of telecommunication network databases, in accordance with some examples of the present disclosure.

At operation 402, the process can include storing first data and second data in a first database (e.g., the UDR 102). In some examples, the first data (e.g., modified provisioning data, as discussed above with reference to FIG. 1) can be data of a first type and the second data (e.g., modified session data) can be data of a second type. The first data and the second data can be stored in the UDR 102, which can be associated with a telecommunications network.

At operation 404, the process can include receiving a first message indicating a first backup operation, the first backup operation being utilized to replace third data (e.g., duplicate provisioning data, as discussed above with reference to FIG. 1) of the first type stored in a second database (e.g., the UDR 104) associated with the telecommunications network.

At operation 406, the process can include performing the first backup operation based at least in part on the first message. The first backup operation can include replacing the third data with the first data, by replicating the first data of the UDR 102 in the UDR 104.

At operation 408, the process can include determining an amount of time has expired since a second backup operation of the UDR 104 meets or exceeds a threshold amount of time.

At operation 410, the process can include performing a third backup operation to replace fourth data of the second type stored in the UDR 104. The fourth data can be replaced by the second data, by replicating the second data of the UDR 102 in the UDR 104. The third backup operation can be performed based at least in part on expiration of the amount of time.

Figure 5:
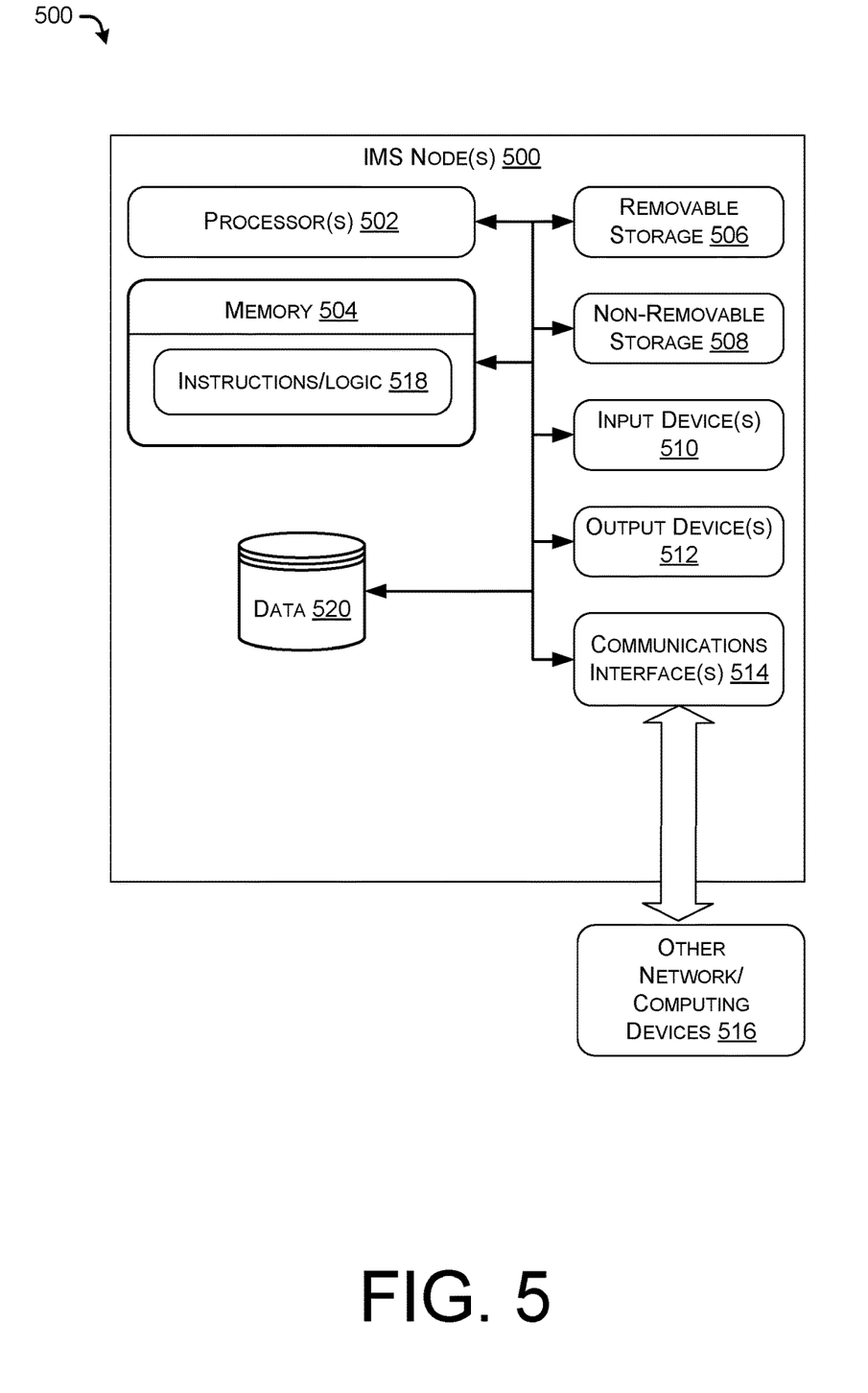
FIG. 5 is a block diagram of an example internet protocol (IP) multimedia system (IMS) node(s) with logic to implement hybrid synchronization of telecommunication network databases, in accordance with some examples of the present disclosure.

FIG. 5 is a block diagram of an example internet protocol (IP) multimedia system (IMS) node(s) with logic to implement hybrid synchronization of telecommunication network databases, in accordance with some examples of the present disclosure. The IMS node(s) 500 may be representative of an individual node (or network element) or multiple nodes (or network elements) of a telecommunications network. In an example, the IMS node(s) 500 may represent multiple nodes including one or more of the service nodes 312, as described herein.

As shown, the IMS node(s) 500 may include one or more processors 502 and one or more forms of computer-readable memory 504. The IMS node(s) 500 may also include additional storage devices. Such additional storage may include removable storage 506 and/or non-removable storage 508.

The IMS node(s) 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The IMS node(s) 500 may further include communications interface(s) 514 that allow the IMS node(s) 500 to communicate with other computing devices 516 (e.g., other nodes, a UE(s), etc.) such as via a network. The communications interface(s) 514 may facilitate transmitting and receiving wired and/or wireless signals over any suitable communications/data technology, standard, or protocol, as described herein.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the IMS node(s) 500. Any such computer-readable storage media may be part of the IMS node(s) 500.

The memory (or "memory component") 504 can include logic 518 (i.e., computer-executable instructions that, when executed, by the processor(s) 502, perform the various acts and/or processes disclosed herein) to implement a hybrid synchronization procedure, according to various examples. For example, the logic 518 is configured to carry out the process 400, as described herein. The memory 504 can further be used to store data 520, which may be used to implement a hybrid synchronization procedure, as described herein. In one example, the data 520 may include a data management tree (e.g., the data management tree 200, as discussed above with reference to FIG. 2) and/or subscription information (e.g., the subscription information 202). In some examples, any portion (e.g., a partial portion or an entire portion) of the data management tree 200 and/or the subscription information 202 can be stored in the data 520 of an IMS node 500, and/or any portion (e.g., a partial portion or an entire portion) of the data management tree 200 and/or the subscription information 202 can be stored in one or more other memory components of other IMS nodes 500.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A system comprising:
one or more processors; and
memory storing computer-executable instructions that, when executed by the one or more processors, cause the one or more processors to perform operations comprising:
storing first data of a first type and second data of a second type in a first database associated with a telecommunications network, wherein the first type of data is provisioning data and the second type of data is session data;
receiving a first message indicating that a first backup operation of the first database associated with the telecommunications network is performed, the first backup operation modifying the first data to be first modified data of the first type;
performing a second backup operation of first duplicate data in a second database based on the first message, the first duplicate data matching the first data, the second backup operation modifying the first duplicate data to be the first modified data, wherein the second backup operation is a synchronous synchronization operation;
performing a third backup operation of second modified data of the second type at an initial time, wherein the second data has been modified to be the second modified data prior to the initial time; and
performing a fourth backup operation of second duplicate data in the second database based on an amount of time between the initial time and a current time meeting or exceeding a threshold amount of time, the fourth backup operation modifying the second duplicate data to be the second modified data, wherein the fourth backup operation is an asynchronous synchronization operation.

2. The system of claim 1, wherein a tree component associated with the first data is grouped with other tree components of a directory information tree or a document based tree, individual ones of the other tree components being associated with other provisioning data.

3. The system of claim 1, wherein the first data of the first type is at least one of circuit provisioning data, service provisioning data, or switch provisioning data.

4. The system of claim 1, wherein a tree component associated with the session data is grouped with other tree components of a directory information tree or a document based tree, individual ones of the other tree components being associated with other session data.

5. The system of claim 1, wherein the first database and the second database are unified data management (UDM) databases.

6. The system of claim 1, wherein performing the fourth backup operation further comprises performing the fourth backup operation of the second duplicate data based on a first priority level associated with the second modified data, the operations further comprising:
performing a fifth backup operation of third data of the second type based on a second priority level associated with the third data.

7. The system of claim 1, wherein the second modified data is associated with an IP multimedia system (IMS) update, the operations further comprising:
performing a fifth backup operation of third data associated with a home location register (HLR) update, the fourth backup operation being performed prior to the fifth backup operation based on replication associated with the IMS update having a higher priority level than for replication associated with the HLR update.

8. A computer-implemented method comprising:
determining a first synchronization parameter associated with first data of a first type stored in a first database associated with a telecommunications network, the first data being modified as first modified data of the first type, the first synchronization parameter being determined based at least in part on a message received from the first database, and the first type of data being provisioning data;

synchronizing a second database associated with the telecommunications network with the first database to replicate the first modified data in the second database, based at least in part on the first synchronization parameter, the first modified data replacing first duplicate data in the second database, the first duplicate data matching the first data, wherein synchronizing the second database with the first database to replicate the first modified data is performed synchronously;

determining a second synchronization parameter associated with second data of a second type stored in a first database, second duplicate data matching the second data being stored in the second database, the second data being modified as second modified data of the second type, the second synchronization parameter being determined based at least in part on a time period lapsing, the time period beginning at a previous synchronization, and the second type of data being session data; and synchronizing the second database with the first database to replicate the second modified data in the second database, based at least in part on the second synchronization parameter, wherein synchronizing the second database with the first database to replicate the second modified data is performed asynchronously.

9. The method of claim 8, wherein synchronizing the second database with the first database to replicate the first modified data is based at least in part on the first synchronization parameter being a near real-time parameter, a tree component associated with the first modified data being grouped with other tree components of a directory information tree or a document based tree, individual ones of the other tree components being associated with other data of the first type.

10. The method of claim 8, wherein synchronizing the second database with the first database to replicate the second modified data is based at least in part on the second synchronization parameter being a time period parameter, a tree component associated with the second data being grouped with other tree components of a directory information tree or a document based tree, individual ones of the other tree components being associated with other data of the second type.

11. The method of claim 8, wherein synchronizing the second database with the first database to replicate the second modified data further comprises replicating the second modified data based at least in part on a first priority level associated with the second modified data, further comprising:

synchronizing the second database with the first database to replicate third data of the second type based at least in part on a second priority level associated with the third data.

12. The method of claim 8, wherein the second modified data is of a first sub-type of the second type, further comprising:

synchronizing the second database with the first database to replicate third data of a second sub-type of the second type, the second modified data being replicated prior to the third data based on replication associated with the first sub-type having a higher priority level than for the first sub-type.

13. The method of claim 8, wherein the first modified data of the first type is provisioning data, further comprising:

grouping a tree component associated with the first modified data in the second database with other tree components of a directory information tree or a document based tree, the other tree components being associated with other provisioning data.

14. The method of claim 8, wherein the second modified data of the second type is session data, further comprising:

grouping a tree component associated with the second modified data in the second database with other tree components of a directory information tree or a document based tree, the other tree components being associated with other session data.

15. A system comprising:

one or more processors; and memory storing computer-executable instructions that, when executed by the one or more processors, cause the one or more processors to perform operations comprising:

storing, in a first database associated with a telecommunications network, first data of a first type and second data of a second type, wherein the first type of data is provisioning data and the second type of data is session data;

receiving a first message indicating a first backup operation, the first backup operation being utilized to replace third data of the first type stored in a second database associated with the telecommunications network;

performing the first backup operation based at least in part on the first message, the first backup operation replacing the third data with the first data, wherein performing the first backup operation further comprises performing a synchronous synchronization operation;

determining an amount of time has expired since a second backup operation of the second database meets or exceeds a threshold amount of time; and performing, based at least in part on expiration of the amount of time, a third backup operation to replace fourth data of the second type stored in the second database, the fourth data being replaced by the second data, performing the third backup operation further comprises performing an asynchronous synchronization operation.

16. The system of claim 15, wherein performing the first backup operation is further based at least in part on the first data being provisioning data.

17. The system of claim 15, wherein performing the third backup operation is further based at least in part on the second data being session data.

18. The system of claim 15, wherein the first database and the second database are unified data management (UDM) databases.

* * * * *